Figure 1:
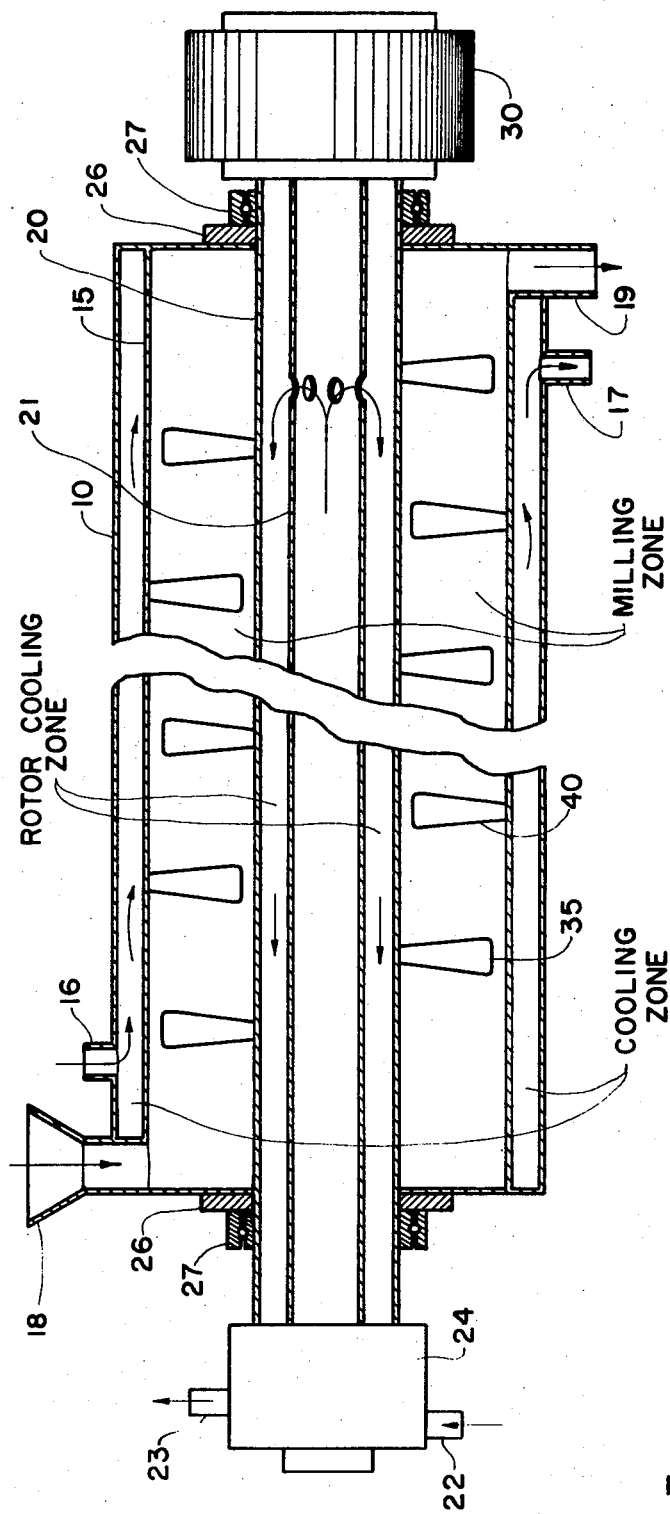

United States Patent

Schallis

[15] 3,688,992
[45] Sept. 5, 1972

[54] PROCESS AND APPARATUS FOR THE ACTIVATION OF CATALYSTS

[72] Inventor: Alvin Schallis, Irvington, N.Y.

[73] Assignee: Stauffer Chemical Company, New York, N.Y.

[22] Filed: April 15, 1970

[21] Appl. No.: 28,902

[52] U.S. Cl..........................................241/23, 241/30
[51] Int. Cl.................................................B02c 17/16
[58] Field of Search..........241/18, 23, 30, 54, 65, 66, 241/67

[56] References Cited

UNITED STATES PATENTS 3,032,510  5/1962  Tornquist...................252/429
2,431,565  11/1947  Klock.........................241/18 X
3,398,900  8/1968  Guba et al....................241/67
1,735,396  11/1929  Hiller........................241/66 X
2,035,090  3/1936  Molin........................241/67 X Primary Examiner—Granville Y. Custer, Jr.
Attorney—Daniel S. Ortiz, Wayne C. Jaeschke and Martin Goldwasser

[57] ABSTRACT

Co-crystals of partially reduced transition metal halides are activated by stirring the co-crystals with a plurality of grinding media in an oxygen free milling zone while maintaining the temperature within said zone below 80° C.

12 Claims, 1 Drawing Figure

INVENTOR
ALVIN SCHALLIS

PROCESS AND APPARATUS FOR THE ACTIVATION OF CATALYSTS

BACKGROUND OF THE INVENTION

This invention relates to a method and apparatus for preparing highly activated catalyst components, and particularly to the preparation of a highly activated titanium trichloride-aluminum trichloride co-crystal.

Prior to the present invention, it was known that ethylene, propylene and other olefins as well as unsaturated aliphatic hydrocarbons such as butylene, butadiene, 1-octene and the like could be polymerized at relatively low pressure, not substantially exceeding atmospheric pressure, in a liquid medium by utilizing various reducible heavy metal compounds such as the halides, acetonates and the like of metal Groups IV through V and Group VIII of the periodic table, e.g. of titanium, zirconium, vanadium, chromium and iron. It was also known that polymers of alpha-olefins containing more than two carbon atoms, such as propylene, butene-1, octene-1 and the like can be prepared by polymerizing the desired olefin with a catalyst system comprising a preformed, partially reduced, transition metal halide which is utilized alone, or while co-crystallized with a Group II or III metal halide, which is then activated by admixing it with an organo-metallic compound. A particularly effective catalyst of this type is the purple, crystalline, titanium trichloride-aluminum trichloride co-crystal activated by a trialkyl aluminum compound.

Increases in the activity of these types of catalyst systems have been achieved by milling the transition metal halide, or co-crystal thereof, prior to activating it with the organo-metallic compound. This milling has heretofore been carried out in conventional ball, rod or pebble mills. It is known, however, that the activation is not merely proportional to particle size since increases in activity occur upon further milling of the components even though they have reached the smallest particle size achievable with that particular mill. Activity is dependent, in part, upon the crystal structure, which in turn is determined by the impact energy, grinding efficiency, and temperature at which milling takes place. The maximum activity achieved by conventional milling equipment is limited because of the interaction of these parameters. Thus, in a conventional ball mill, sufficient impact energy cannot be obtained unless large diameter balls are employed, but these large balls have poor grinding efficiency and tend to deactivate the co-crystals while they are rolling.

TECHNICAL DISCLOSURE OF THE INVENTION

It has now been discovered that polymerization catalysts having substantially higher activation levels can be produced in considerably less time by stirring, i.e., milling, co-crystals of the transition metal halide-Group II or III metal halide with a plurality of grinding media in an oxygen free milling zone while maintaining the temperature in the milling zone below about 80° C. prior to its subsequent activation with an organo-metallic compound.

The partially reduced transition metals used in the present invention are the halides, preferably the chlorides, of the transition metals of Groups IV, V and VIII of the periodic table such as titanium, zirconium, thorium, vanadium, tantalum, chromium, molybdenum and tungsten. The term "partially reduced" transition metal halides is understood to mean transition metal halides, the transition metal components of which have a valence of at least one unit below their normal maximum valence. The Group II or III metal halide co-crystallized with the partially reduced transition metal halide is preferably a chloride such as aluminum chloride and the like. The use of a crystalline titanium trichloride-aluminum trichloride co-crystal is preferred in the present invention. The purple delta form of this co-crystal is particularly preferred. The transition metal halide-Group II or III metal halide co-crystal contains from about two to about four moles, and preferably from about three to about four moles, of the transition metal halide per mole of the Group II or III metal halide. These co-crystals are well known in the art and can be produced by many routes. For example, the purple crystalline titanium trichloride-aluminum trichloride co-crystal can be produced by the reduction of titanium tetrachloride with an aluminum alkyl in an inert diluent or with aluminum powder in aromatic diluents at elevated temperatures.

FIG. 1 in the appended drawing diagrammatically illustrates, in elevation, a preferred embodiment of the apparatus which is employed in carrying out the process of the present invention.

The apparatus depicted in FIG. 1 comprises, in combination: a substantially cylindrical outer casing 10 which is sealed at both ends; a substantially cylindrical inner casing 15 axially disposed within the outer casing 10, thereby forming a cooling zone between it and the outer casing 10; a rotor 20 axially disposed within the inner casing 15, and penetrating the sealed ends of outer casing 10, thereby forming a milling zone between the rotor 20 and the inner casing, which milling zone is peripherally surrounded by the cooling zone; a plurality of paddles 35 attached at intervals to the rotor 20 and extending outwardly from the rotor into the milling zone, a plurality of baffles 40 attached at intervals to the inner casing 15 and extending into the milling zone at alternate intervals to the paddles 35; and means 30 for revolving the rotor 20.

The outer casing 10 is shown in FIG. 1 in one embodiment of the present invention as a horizontally disposed, elongated casing, being substantially cylindrical in shape. Outer casing 10 is fitted at opposite ends with coolant input 16 and coolant output 17 such that a coolant introduced into the cooling zone through the coolant input 16 is circulated throughout the length of the cooling zone and then removed through the coolant output 17. The coolant is then cooled and recirculated. Outer casing 10 and inner casing 15 are further fitted at opposite ends with catalyst input 18 and catalyst output 19 which are in open communication with the milling zone, such that the grinding media and co-crystal catalyst mixture is introduced into the milling zone through the catalyst input 18, travels the length of the milling zone and is removed from the zone through the catalyst output 19.

In another embodiment of the present invention, the grinding media are introduced into the milling zone whereupon screens having a mesh size which prevents passage therethrough of the grinding media are secured over both the catalyst input 18 and the catalyst output 19, thereby retaining the grinding media in the milling zone. Since the catalyst component exhibits fluid flow when agitated in the milling zone, the catalyst component is then introduced through the screen over the catalyst input 18, and flows through the milling zone and out through the screen over the catalyst output 19, thereby obviating the steps of mixing and subsequently separating the grinding media and catalyst component.

The rotor 20 can be either solid or hollow. In the preferred embodiment of the present invention, a hollow rotor is employed and a coolant is circulated through it thereby creating a rotor cooling zone axially disposed within the milling zone. The coolant can flow directly through the rotor or be circulated in the manner shown in the drawing by means of channel rod 21 which is axially disposed within the rotor 20 and in communication with the rotor cooling zone at one end and rotor joint 24 at the other end. Rotary joint 24 is fitted with coolant input means 22 and coolant output means 23. In another embodiment of the present invention, rotor 20 can be fitted with an inverse helical impeller at the end opposite the catalyst input means 18. This impeller would have conveying characteristics opposing the flow of the grinding media-catalyst mixture and would thereby prevent a pressure buildup at the output end of the milling zone.

Outer casing 10 is fitted at each end with a seal 26 and a bearing 27 which are mounted concentrically around the rotor to allow lubrication of the rotor, to prevent the loss of material and to maintain the milling zone free from contaminants.

The apparatus employed in the present invention can also be substantially vertically disposed. In this case, the paddles and baffles should have an upwardly conveying characteristic to relieve excess pressure buildup at the bottom of the milling zone.

The apparatus can be operated in a batchwise or continuous manner. The residence time in the milling zone in the continuous embodiment will be determined by the rate of flow of the grinding media and catalyst (or, if the screens are employed, by the flow of the catalyst alone) into the milling zone.

The milling zone must be kept substantially free from oxygen, for example oxygen as contained in air, in order to achieve the desired activity levels of the present invention. This is accomplished by flushing the milling zone with an inert gas, preferably nitrogen, prior to introducing the co-crystals into the milling zone. The inert gas can be introduced through the catalyst input 18 or through a purge system fitted to one of the seals 26. In the continuous embodiment of the present invention, the inert gas will be continually flushed through the milling zone. In the batchwise embodiment, catalyst input 18 and catalyst output 19 are each fitted with an air tight closure device which is sealed after the system has been flushed with the inert gas and the co-crystal-grinding media mixture has been introduced into the milling zone. Typical of such closure devices are ball valves, pinch valves and butterfly valves. The inert gas should be maintained within the milling zone at a pressure greater than that of the surrounding external pressure, i.e. greater than the surrounding air pressure, in order to maintain an oxygen-free milling zone.

In the process of the present invention, it is essential to maintain the temperature below about 80° C. At temperatures above about 80° C., deactivation occurs too rapidly to achieve the high activities which are otherwise attainable by means of the process of the present invention. Although the reason for this is not known, it is believed that this deactivation is due to a phase change from the highly active delta form to the less active gamma form of the transition metal halide co-crystal. However, this theory is put forth as a possible explanation only and the invention is not to be limited thereto. The lower temperature limit is dependent only upon the efficiency of the coolant and is not of vital significance to the process. For most applications, the temperature is maintained in the range from about 20° C. to about 60° C.

The grinding media employed in the present invention can be made of any substance which is hard enough to withstand the impacts imparted by the apparatus. Accordingly, any hard metal or ceramic material which may be in the shape of balls, cylinders, and the like, can be employed. However, for most applications the preferred material is made of steel. For purposes of convenience, the subsequent disclosure will be presented with respect to the use of grinding media which are in the shape of balls. However, the present invention is not intended to be limited to such usage.

It is to be noted that grinding media size, milling zone temperature and paddle tip speed are interdependent factors which are also essential to this invention. Thus, the milling efficiency of the apparatus when employing steel balls, and hence the rate of activation, has been found to be inversely proportional to the square of the diameter of the balls. For these reasons, when balls having a diameter greater than about ½ inch are used in the present invention, the rate of activation is too slow to be commercially practical. Conversely, balls having diameters which are smaller than about 3/16 inch generate less energy upon impact and therefore require impracticably high paddle tip speeds to activate the crystals of the catalyst component to the activities desired. It has been determined that the grinding ball diameter for use in the present invention is in the range of from about ¼ to about ⅜ inch at the rotor speeds normally employed. Increasing the paddle tip speed, that is, increasing the rate of rotation of the rotor, increases the impact energy of the balls and, hence, the maximum activity that may be achieved provided that the temperature can be maintained below 80° C. It is obvious, then, that smaller balls can be used at higher paddle tip speeds. In order for balls rolling in a conventional ball mill to achieve the same impact energy as ¼ inch balls in the apparatus of the present invention where the paddle tip speed is 13.1 ft/sec., the balls would have to be 1.4 inches in diameter. Such large balls are very inefficient in that the number of impacts per unit weight is much less than with smaller balls. Hence, activation would take much longer. Further, the balls are rolling in the mill between impacts and, during this time, they do not have sufficient energy to activate the co-crystals but can have sufficient energy to cause phase changes in the delta form crystals and thereby deactivate them. Normally, when employing balls having diameters between ¼ and ⅜ inch, paddle tip speeds of between about 5 to about 20 ft/sec. can be employed. The preferred speed is from about 10 to about 15 ft/sec. The upper limit will be determined by the heat transfer efficiency.

It has been found that pressurizing the ball mass, by either mechanical means such as pressuring paddles and baffles or by increasing the ball charge, does not increase the maximum activity that may be achieved. Further, increasing the proportion of balls to co-crystals does not increase the maximum activity achieved. However, it does serve to increase the rate of activation, i.e. the greater the proportion of balls to co-crystals, the shorter the time necessary to reach maximum activity.

The residence time in the milling zone necessary to achieve the designed activities of the present invention is normally in the range of from about 5 to about 30 hours. The preferred residence time is from about 10 to about 20 hours. This is substantially shorter than the milling times required by conventional milling techniques.

The present invention will be further illustrated by the following examples:

EXAMPLES 1 – 26

The catalyst component used in the following examples is a commercially available, partially reduced $TiCl_3$-$AlCl_3$ co-crystal in the delta form which was obtained by reducing $TiCl_4$ with aluminum. The apparatus employed was vertically disposed and had an internal diameter of 12 inches, an overall length of 18 inches and a capacity of 1 cubic foot. Water was used as the coolant in the outer heat exchange chamber and its flow was monitored by a rotameter. A solid rotor was employed. The apparatus was fitted with three thermocouples to measure the product temperature and the cooling water inlet and outlet temperatures. To keep the feed and product free from air contamination, the apparatus was connected to a nitrogen line. Activities were measured by activating the milled catalyst component with diethyl aluminum chloride, and then using this catalyst to polymerize propylene at 55° C. and 30 psig. for 3 ½ hours. The product was washed with ethanol and then with n-heptane. The activity was measured in grams of polymer produced per gram of titanium trichloride employed in the polymerization.

26 examples were conducted using various conditions. The conditions and results of these examples are contained in Table 1.

Examples 1 – 13

TABLE I

| Ex. No. | 1 | 2 | 3 | 4 | 5 | 6 | 7 | 8 | 9 | 10 | 11 | 12 | 13 |
|---|---|---|---|---|---|---|---|---|---|---|---|---|---|
| Ball size (inches) | 3/8 | 3/8 | 3/8 | 3/8 | 3/8 | 3/8 | 3/8 | 3/8 | 3/8 | 3/8 | 3/8 | 3/8 | 3/8 |
| Ball charge (pounds) | 150 | 150 | 150 | 150 | 150 | 150 | 180 | 180 | 180 | 180 | 180 | 180 | 180 |
| $TiCl_3$—$AlCl_3$ Charge (pounds) | 17 | 16 | 16 | 17 | 15 | 16 | 16 | 17 | 17 | 15 | 15 | 17 | |
| Batch time (Hours) | 8 | 12 | 16 | 20 | 30 | 40 | 10 | 10 | 10 | 8 | 10 | 12 | |
| Paddle tip speed (ft/sec.) | 9.1 | 9.1 | 9.1 | 9.1 | 9.1 | 9.1 | 9.1 | 9.1 | 9.1 | 9.1 | 13.1 | 13.1 | 13.1 |
| Product temp (C) | 40 | 38 | 37 | 37 | 37 | 42 | 40 | 60 | 80 | 100 | 51 | 52 | 50 |
| Activity (gm of polymer/gm of $TiCl_3$) | 163 | 188 | 200 | 223 | 230 | 227 | 204 | 207 | 140 | 141 | 204 | 220 | 230 |
| $C_7$ insoluble (%) | 97 | 96 | 97 | 96 | 96 | 96 | 97 | 97 | 97 | 96 | 97 | 97 | 96 |

| Ex. No. | 14 | 15 | 16 | 17 | 18 | 19 |
|---|---|---|---|---|---|---|
| Ball size (inches) | 3/8 | 3/8 | 3/8 | 3/8 | 3/8 | 3/8 |
| Ball charge (pounds) | 180 | 210 | 210 | 238 | 238 | 238 |
| $TiCl_3$—$AlCl_3$ Charge (pounds) | 16 | 13 | 17 | 16 | 19.5 | 17 |
| Batch time (hours) | 14 | 10 | 10 | 10 | 10 | 23 |
| Paddle tip speed (ft/sec) | 13.1 | 13.1 | 13.1 | 13.1 | 13.1 | 13.1 |
| Product temp. (C) | 50 | 55 | 52 | 58 | 56 | 56 |
| activity (gm of polymer/gm of $TiCl_3$) | 250 | 231 | 230 | 229 | 227 | 255 |
| $C_7$ insoluble (%) | 97 | 97 | 97 | 97 | 97 | 96.5 |

| Ex. No. | 20 | 21 | 22 | 23 | 24 | 25 | 26 |
|---|---|---|---|---|---|---|---|
| Ball Size (inches) | 3/8 | 3/16 | 3/16 | 3/16 | 3/16 | 3/8 | 3/8 |
| Ball Charge (pounds) | 260 | 180 | 180 | 180 | 180 | 180 | 180 |
| $TiCl_3$—$AlCl_3$ Charge (pounds) | 23.5 | 15 | 15 | 14 | 14 | 16 | 17 |
| Batch Time (hours) | 10 | 2 | 5 | 5 | 8 | 4 | 6 |
| Paddle tip speed (ft/sec) | 13.1 | 13.1 | 13.1 | 13.1 | 13.1 | 13.1 | 13.1 |
| Product temp. (C) | 60 | 60 | 75 | 54 | 53 | 50 | 51 |
| Activity (gm of polymer/gm of $TiCl_3$) | 212 | 84 | 138 | 154 | 190 | 165 | 195 |
| $C_7$ insoluble (%) | 97.5 | 96 | 96 | 96 | 96 | 96 | 96 |

Examples 9 and 10 demonstrate the criticality of maintaining the temperature below 80° C. Examples 1 – 26 make it evident that the amount of the ball charge was not critical. The effect of rotor speed can be seen from a comparison of Examples 1 to 10, and 15 to 20. At the higher rotor speed, greater activities were achieved in shorter periods of time. Further, optimum activities were achieved when balls of ⅜ inch diameter were employed.

Similar tests were made with catalyst components which had been activated by ball milling for periods up to 40 hours. The highest activities achievable by this method were in the range of about 165 grams of polymer per gram of catalyst. Therefore, the results contained in Table I clearly demonstrate the superior activities achieved by the process of the present invention.

Examples 27 – 38 employed the same catalyst component as that used in Examples 1 to 26. The apparatus employed was horizontally disposed and essentially the same as that shown in the drawing. It had an overall length of 20 feet and an internal diameter of 24 inches. Water was employed as the coolant in both the casings and the rotor. The paddle tip speed of the rotor was 8.5 Ft/Sec. (100 RPM). The temperature was maintained at 50° C. to 60° C. and steel balls having a diameter of ⅜ inches were employed as the grinding balls.

TABLE II

Examples 27 – 38

| Ex. No. | 27 | 28 | 29 | 30 | 31 | 32 | 33 | 35 | 34 | 36 | 37 | 38 |
|---|---|---|---|---|---|---|---|---|---|---|---|---|
| pounds of component produced | 530 | 270 | 440 | 450 | 360 | 286 | 460 | 444 | 679 | 632 | 615 | 650 |
| milling time (hours) | 18 | 16 | 12 | 24 | 6 | 9 | 16 | 18 | 18 | 18 | 21 | |
| activity (gm of polymer/gm of $TiCl_3$) | 249 | 229 | 231 | 242 | 206 | 218 | 238 | 182 | 198 | 221 | 212 | 236 |

Examples 39 – 50 were carried out in the same manner as Examples 27 – 38 with the exception that the paddle tip speed was 13.1 Ft/Sec. (125 RPM). The results are contained in Table III.

As can be seen from Table III, the higher tip speed gave a substantial increase in the activity of the product.

TABLE III

| Ex. No. | 39 | 40 | 41 | 42 | 43 | 44 | 45 | 47 | 46 | 48 | 49 | 50 |
|---|---|---|---|---|---|---|---|---|---|---|---|---|
| pounds of component | 480 | 587 | 733 | 552 | 624 | 401 | 637 | 679 | 642 | 574 | 712 | 816 |
| run time | 18 | 19 | 22 | 24 | 19 | 22 | 21 | 18.21 | 18 | | 18 | 24 |
| activity (gm of Polymer/gm of $TiCl_3$) | 251 | 246 | 242 | 251 | 231 | 232 | 232 | 247 | 243 | 244 | 258 | 252 |

What is claimed is:

1. A process for the activation of a co-crystal of a transition metal halide and the halide of a metal selected from the group consisting of the metals of Groups II and III of the Periodic Table, which process comprises stirring said co-crystal in an oxygen free milling zone with a plurality of grinding media while maintaining the temperature in said milling zone below 80° C.

2. The process of claim 1, wherein said co-crystal is a titanium trichloride-aluminum trichloride co-crystal.

3. The process of claim 1 wherein the stirring is accomplished by rotating a rotor which is axially disposed within said milling zone and which has a plurality of paddles attached thereto, at a rate sufficient to impart a paddle tip speed in the range from about 5 to about 20 ft/sec.

4. The process of claim 3, wherein said grinding media comprise steel balls.

5. The process of claim 4, wherein said grinding media have a diameter of about 3/16 to about ½ inch.

6. A process for the activation of a titanium trichloride-aluminum trichloride co-crystal catalyst which comprises:
   a. comingling said catalyst with a plurality of steel balls having a diameter in the range from about 3/16 to about ½ inch;
   b. introducing the steel ball-catalyst mixture resulting from step (a) into an oxygen free milling zone;
   c. stirring said mixture in said milling zone for a period of from about 5 to about 30 hours while maintaining the temperature in said milling zone below 80° C.; and,
   d. removing said mixture from the milling zone.

7. The process of claim 6, wherein steps (a) and (b) are performed simultaneously.

8. The process of claim 6, wherein said titanium trichloride-aluminum trichloride co-crystal is in the purple crystalline delta form.

9. The process of claim 6 wherein the stirring is accomplished by rotating a rotor which is axially disposed within said milling zone and which has a plurality of paddles attached thereto at a rate sufficient to impart a paddle tip speed in the range from about 5 to about 20 ft/sec.

10. The process of claim 8 wherein said paddle tip speed is in the range from about 10 to about 15 ft/sec.

11. The process of claim 8 wherein said titanium trichloride-aluminum trichloride co-crystal is in the purple crystalline delta form.

12. The product of the process of claim 11.

* * * * *